(12) United States Patent
Kim et al.

(10) Patent No.: US 11,280,631 B2
(45) Date of Patent: Mar. 22, 2022

(54) MOVING PATH GUIDE PROVIDING METHOD, DEVICE, SYSTEM, AND COMPUTER PROGRAM

(71) Applicant: NAVER LABS CORPORATION, Seongnam-si (KR)

(72) Inventors: Jungon Kim, Seongnam-si (KR); Wonki Kang, Seongnam-si (KR)

(73) Assignee: NAVER LABS CORPORATION, Seongnam-si (KR)

( * ) Notice: Subject to any disclaimer, the term of this patent is extended or adjusted under 35 U.S.C. 154(b) by 0 days.

(21) Appl. No.: 17/217,088

(22) Filed: Mar. 30, 2021

(65) Prior Publication Data

US 2021/0215501 A1 Jul. 15, 2021

Related U.S. Application Data

(63) Continuation of application No. PCT/KR2019/013818, filed on Oct. 21, 2019.

(30) Foreign Application Priority Data

Dec. 5, 2018 (KR) .................. 10-2018-0155478

(51) Int. Cl.
*G01C 21/36* (2006.01)

(52) U.S. Cl.
CPC ..... *G01C 21/3655* (2013.01); *G01C 21/3644* (2013.01)

(58) Field of Classification Search
CPC ................................................ G11C 21/3644
See application file for complete search history.

(56) References Cited

U.S. PATENT DOCUMENTS

| 6,078,865 A * | 6/2000 | Koyanagi .......... G01C 21/3644 |
| | | 701/438 |
| 2002/0120622 A1 | 8/2002 | Hasegawa et al. |
| 2006/0184320 A1 | 8/2006 | Hong |
| 2007/0078596 A1* | 4/2007 | Grace ................ G06Q 30/0265 |
| | | 701/533 |
| 2008/0262714 A1* | 10/2008 | Abramovich Ettinger ................ |
| | | G01C 21/34 |
| | | 701/533 |
| 2011/0178697 A1* | 7/2011 | Mincey ............. G01C 21/3644 |
| | | 701/532 |

(Continued)

FOREIGN PATENT DOCUMENTS

| JP | 2002260160 A | 9/2002 |
| JP | 2005121596 A | 5/2005 |

(Continued)

OTHER PUBLICATIONS

Search report issued in Int'l. Application No. PCT/KR2019/013818, dated Jan. 28, 2020.

(Continued)

*Primary Examiner* — Ryan Rink
(74) *Attorney, Agent, or Firm* — Greer Burns & Crain Ltd.

(57) ABSTRACT

In a moving path guide providing method, device, system, and computer program, an information point easily recognizable around a path where a user moves is selected and the moving path is provided to the user on the basis of the selected information point, so as to allow the user to more conveniently and easily move via the path according to the guide.

7 Claims, 16 Drawing Sheets

(56) References Cited

U.S. PATENT DOCUMENTS

| | | | | |
|---|---|---|---|---|
| 2013/0163865 A1* | 6/2013 | Sato | ................... | G01C 21/3602 |
| | | | | 382/165 |
| 2014/0142849 A1* | 5/2014 | Ziezold | .............. | G01C 21/3644 |
| | | | | 701/533 |
| 2016/0161265 A1* | 6/2016 | Bagheri | ................. | G01C 21/32 |
| | | | | 701/450 |
| 2016/0216131 A1* | 7/2016 | Khorana | ............ | G01C 21/3644 |
| 2016/0349059 A1* | 12/2016 | McGuire | ............ | G01C 21/3647 |
| 2017/0241788 A1* | 8/2017 | Chin | ................... | G01C 21/3644 |
| 2017/0314954 A1* | 11/2017 | Golding | ............. | G01C 21/3602 |
| 2018/0112993 A1* | 4/2018 | Schpok | ............. | G01C 21/3664 |
| 2019/0017842 A1* | 1/2019 | Moore | ............... | G01C 21/3407 |
| 2020/0349368 A1* | 11/2020 | Mayster | ............. | G01C 21/3602 |

FOREIGN PATENT DOCUMENTS

| | | |
|---|---|---|
| JP | 2007240193 A | 9/2007 |
| KR | 19980032878 A | 7/1998 |
| KR | 1020100002839 A | 1/2010 |

OTHER PUBLICATIONS

Office action issued in KR 10-2018-0155478, dated Jan. 28, 2020 (with translation).

\* cited by examiner

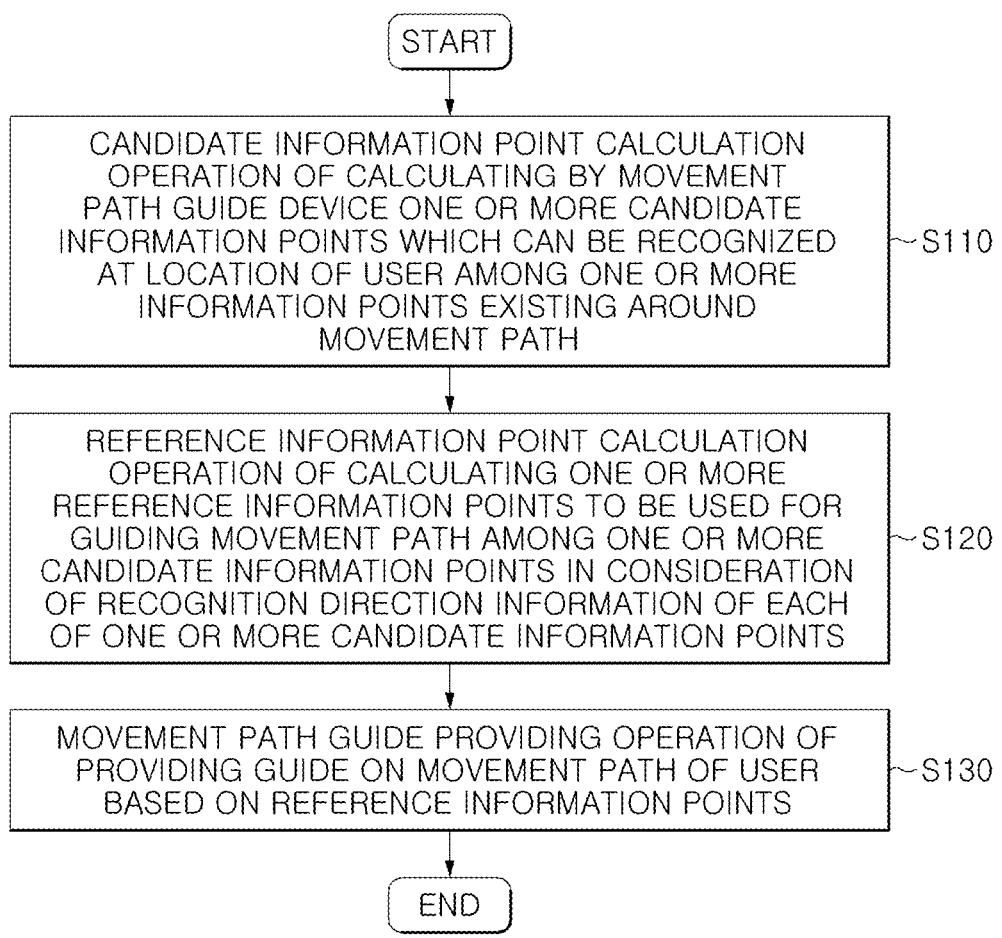

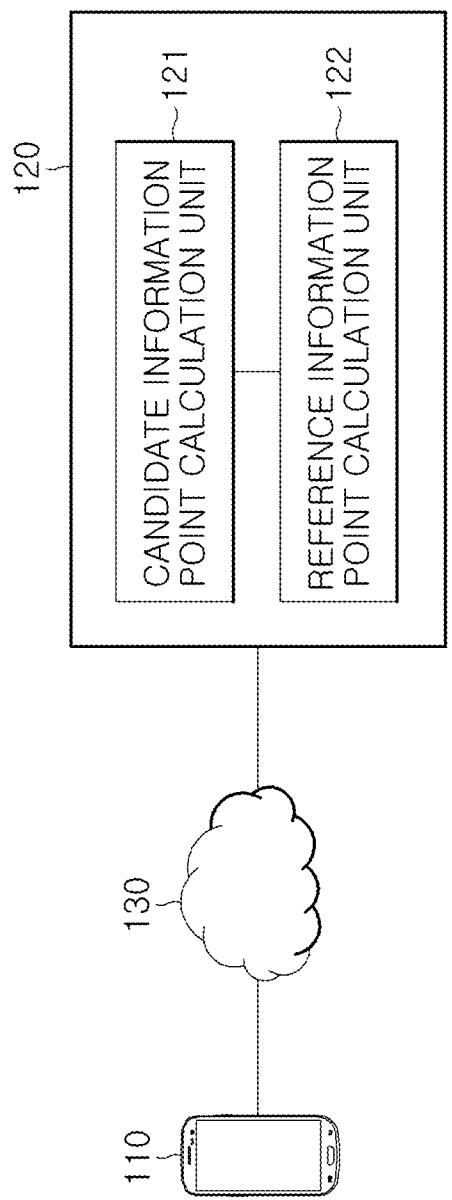

MOVING PATH GUIDE PROVIDING METHOD, DEVICE, SYSTEM, AND COMPUTER PROGRAM

CROSS-REFERENCE TO RELATED APPLICATION

This is a continuation application of International Application No. PCT/KR2019/013818, filed Oct. 21, 2019, which claims the benefit of Korean Patent Application No. 10-2018-0155478, filed Dec. 5, 2018.

BACKGROUND OF THE INVENTION

Field of Invention

The present disclosure relates to a method for providing a movement path guide, a device therefor, a system therefor, and a computer program therefor. More specifically, the present disclosure relates to a method for providing a movement path guide, a device therefor, a system therefor, and a computer program therefor, wherein information points that can be easily recognized around a path of movement of a user are selected, and a path is guided with reference thereto, thereby enabling the user to move along the path more conveniently.

Description of Related Art

Location-based service (LBS) technology, which is based on location information, has recently been utilized variously. As a more specific example, there is widespread use of a vehicle navigation device which is mounted on a vehicle or the like to measure the current location of the vehicle or to guide a path of movement to a destination.

However, a conventional navigation device used for a vehicle or the like guides the path of the vehicle with reference to the road along which the vehicle is to travel in a predetermined direction. That is, the path of movement of the vehicle is guided with reference to the distance and direction, such as "Move forward 1 km" or "Turn right in two o'clock direction after moving 30 m" (FIG. 1A).

However, in the case of a user moving on foot, for example, unlike the case of guiding the path of a vehicle, there is a problem in that, if the path of movement is guided by using the distance and direction, such as "Move forward 50 m" or "Turn right after moving 30 m" (FIG. 1B), the user may have difficulty in accurately moving according to the distance and direction, thereby failing to move along the appropriate path.

That is, if the user moves on foot (not in a vehicle), for example, the degree of freedom of the direction of movement of the user or the path thereof may increase. In such a case, providing a path of movement with reference to signboards, stairs, or the like, which can be easily recognized by the user, is preferred to providing a path with reference to distances and directions.

Moreover, in connection with selecting information points that the user can easily recognize (for example, signboards or stairs) for the purpose of providing a path of movement for the user, it would be preferred to selecting information points that could be recognized by the user more easily.

As such, it is considered more preferable to provide a path of movement with reference to information points that the user can recognize more easily, but no specific scheme for appropriately satisfying such user demands has been provided.

BRIEF SUMMARY OF THE INVENTION

The present disclosure has been made to solve the above-mentioned problems occurring in the prior art, and it is an aspect of the present disclosure to provide a method for providing a movement path guide, a device therefor, a system therefor, and a computer program therefor, wherein when a user moves on foot (not in a vehicle), for example, a path of movement can be provided with reference to information points that can be easily recognized around the path of movement of the user.

Other detailed aspects of the present disclosure may be obviously grasped and understood by one of ordinary skill in the pertinent technical field through the following detailed descriptions.

A movement path guide providing method according to an aspect of the present disclosure for solving the above-mentioned problems provides a user with a guide along a movement path from a departure point to a destination, the method including: a candidate information point calculation operation of calculating, by a movement path guide device, one or more candidate information points which can be recognized from a location of the user among one or more information points existing around the movement path; a reference information point calculation operation of calculating one or more reference information points to be used for guiding the user along the movement path among the one or more candidate information points, in consideration of recognition direction information of each of the one or more candidate information points; and a movement path guide providing operation of providing the guide along the movement path of the user, based on the reference information points.

A computer program according to another aspect of the present disclosure is stored in a readable medium such that each operation of the above-mentioned movement path guide providing method can be executed by a computer.

A movement path guide providing device according to another aspect of the present disclosure provides a user with a guide along a movement path from a departure point to a destination, the device including: a candidate information point calculation unit configured to calculate one or more candidate information points which can be recognized from a location of the user among one or more information points existing around the movement path; a reference information point calculation unit configured to calculate one or more reference information points to be used for guiding the user along the movement path among the one or more candidate information points, in consideration of recognition direction information of each of the one or more candidate information points; and a movement path guide providing unit configured to provide the guide along the movement path of the user, based on the reference information points.

A movement path guide providing system according to another aspect of the present disclosure provides a user with a guide along a movement path from a departure point to a destination, the system including: a server which includes a candidate information point calculation unit configured to calculate one or more candidate information points which can be recognized from a location of the user among one or more information points existing around the movement path, and a reference information point calculation unit configured to calculate one or more reference information points to be used for guiding the user along the movement path among the one or more candidate information points, in consideration of recognition direction information of each of the one or more candidate information points; and a terminal configured to provide the guide along the movement path of the user, based on the reference information points.

A method for providing a movement path guide, a device therefor, a system therefor, and a computer program therefor, according to an embodiment of the present disclosure, are advantageous in that information points that can be easily recognized around a path of movement of a user are selected, and a movement path is provided with reference thereto, thereby enabling the user to move along the path more conveniently and easily.

BRIEF DESCRIPTION OF THE DRAWINGS

The accompanying drawings, which are included herein as a part of the detailed description to help understanding of the present disclosure, provide embodiments of the present disclosure, and describe the technical idea of the present disclosure together with the detailed description.

FIG. 2 is a flowchart of a movement path guide providing method according to an embodiment of the present disclosure;

FIG. 13 is a block diagram illustrating a configuration of a movement path guide providing system according to an embodiment of the present disclosure.

DETAILED DESCRIPTION OF THE INVENTION

The present disclosure may be embodied with many different modifications and include various embodiments. Hereinafter, specific embodiments will be described in detail based on the accompanying drawings.

In describing the present disclosure, when it is determined that specific descriptions for related well-known techniques may obscure the subject matter of the present disclosure, the detailed descriptions thereof will be omitted.

Terms such as "first" and "second" may be used in describing various elements, but the elements shall not be restricted to the terms. The terms are used only to distinguish one element from the other.

Hereinafter, exemplary embodiments of a movement path guide providing method, device, system, and computer program according to the present disclosure will be described in detail with reference to the accompanying drawings.

First, FIG. 2 illustrates a flowchart of a movement path guide providing method according to an embodiment of the present disclosure. As shown in FIG. 2, a movement path guide providing method according to an embodiment of the present disclosure is a method for providing a user with a guide along a movement path from a departure point to a destination. The method includes a candidate information point calculation operation (S110) of calculating, by a movement path guide device 110, one or more candidate information points 210 which can be recognized from the location of the user among one or more information points 200 existing around the movement path; a reference information point calculation operation (S120) of calculating one or more reference information points 220 to be used for guiding the user along the movement path among the one or more candidate information points 210, in consideration of recognition direction information of each of the one or more candidate information points 210; and a movement path guide providing operation (S130) of providing the guide along the movement path of the user, based on the reference information points 220.

Hereinafter, the movement path guide providing method according to an embodiment of the present disclosure is described in detail with regard to each operation with reference to FIG. 2.

First, the candidate information point calculation operation (S110) is described. In this operation (S110), the movement path guide device 110 (see FIG. 3) calculates the one or more candidate information points 210 (See FIG. 5A) which can be recognized from the location of the user among the one or more information points 200 (See FIGS. 4A and 4B) existing around the movement path.

Figure 1A:
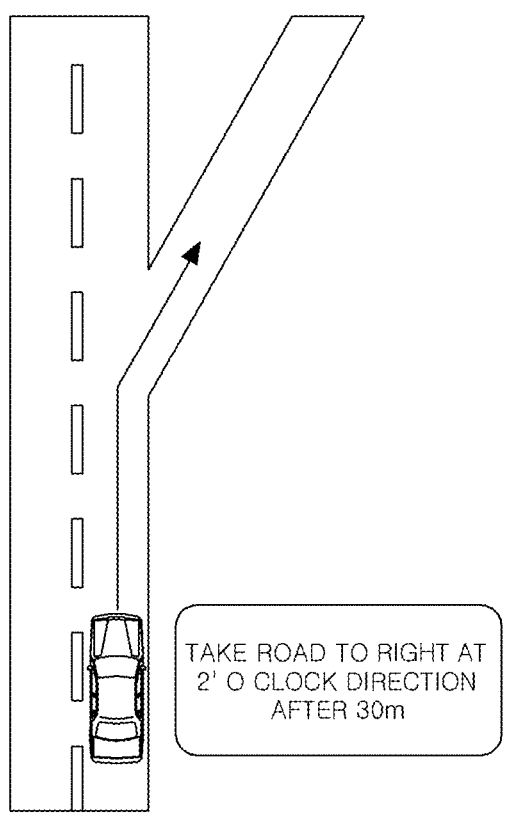
FIGS. 1A and 1B are diagrams illustrating a movement path guide according to the prior art.
Figure 1B:
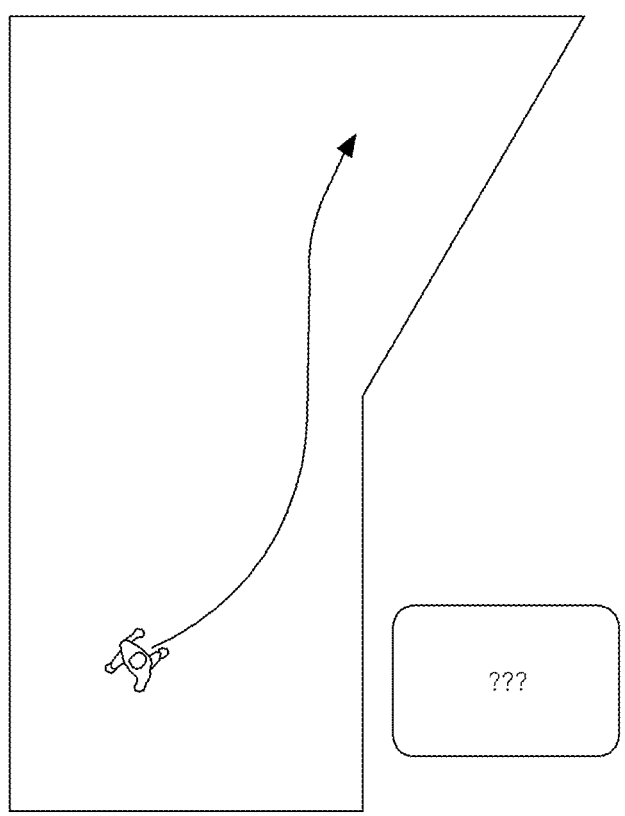
Figure 3:
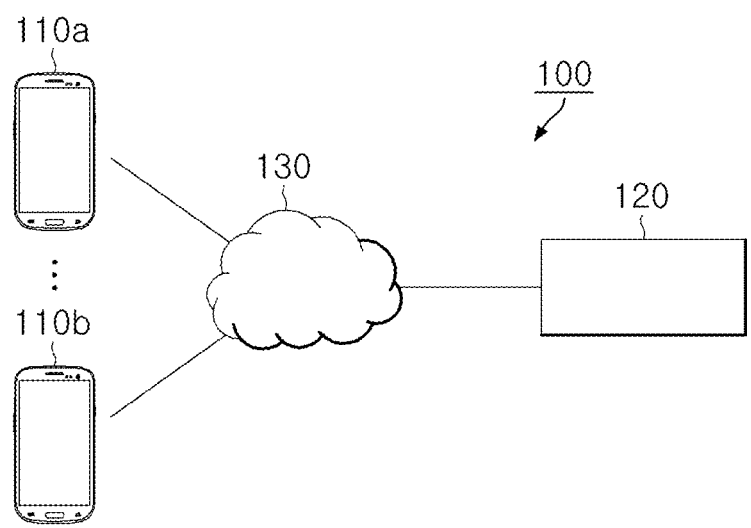
FIG. 3 is a diagram illustrating a configuration of a movement path guide providing system according to an embodiment of the present disclosure.

In this case, the movement path guide device 110 may include various portable terminals such as a smart phone, a tablet PC, a PDA, and a mobile phone. Accordingly, as shown in FIG. 3, the movement path guide device 110 may be connected to a server 120 through a wired or wireless communication network 130, and download an application from the server 120 and install the application, or receive necessary information, such as map information, supplied from the server 120 and provide a movement path guide to the user. However, the present disclosure is not necessarily limited thereto, and the movement path guide device 110 may be implemented in various forms, such as a dedicated device for a movement path guide, and may be independently driven without interlocking with the server 120.

In this case, the movement path guide device 110 may calculate the movement path from the departure point to the destination by using the map information and the like. However, the present disclosure is not necessarily limited thereto, and the movement path guide device 110 may receive and use a movement path calculated by the server 120 or an external device.

In addition, the network 130 which connects the movement path guide device 110 and the server 120 may include a wired network and a wireless network, and specifically, include various communication networks such as a local area network (LAN), a metropolitan area network (MAN), and a wide area network (WAN). In addition, the network 130 may include a known world wide web (WWW). However, the communication network 130 according to the present disclosure is not limited to the networks listed above, and may include, as at least a part thereof, various wireless communication networks such as a known mobile communication network, a wireless LAN, and Bluetooth, a known telephone network, or a known wired and wireless television network.

In addition, in the movement path guide providing method, device, system and computer program according to an embodiment of the present disclosure, an information point (point of information: POI) 200 refers to an object which can be identified while a user moves along a movement path, such as a signboard of a store, a sculpture, and stairs located around the movement path.

Accordingly, in the movement path guide providing method, device, system and computer program according to an embodiment of the present disclosure, in providing a guide along a movement path from a departure point to a destination to the user by the movement path guide device 110, the movement path guide device selects an information point (that is, a reference information point) which can be easily recognized even while the user moves on foot, among a plurality of information points 200 existing around the path where the user moves, and provides the movement path to the user, based on the selected information point, so that the user can more conveniently and easily move along the path according to the guide.

Figure 4A:
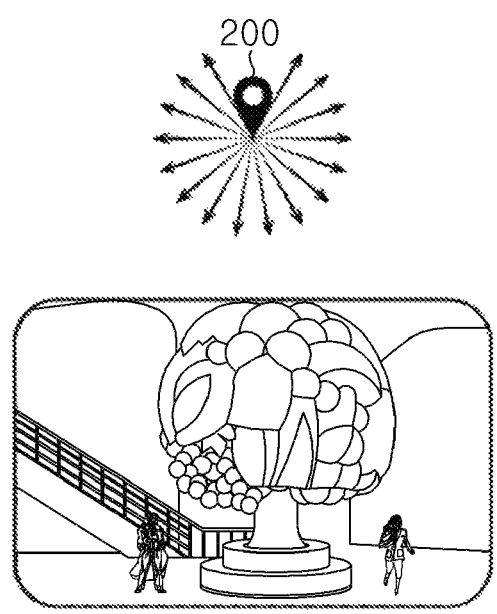
FIGS. 4A and 4B are diagrams illustrating an information point according to an embodiment of the present disclosure.
Figure 4B:
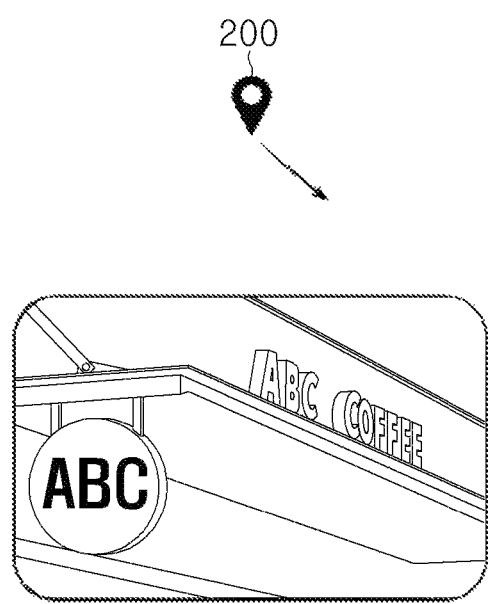

In this case, as shown in FIGS. 4A and 4B, the information points 200 may have a recognizable distance and a recognizable direction according to characteristics such as size, shape, and color.

For example, as shown in FIG. 4A, when there is a large-sized sculpture, the recognizable distance is long, and with respect to the recognition direction, recognition is possible from all directions 360 degrees. That is, in the case of FIG. 4A, recognizable distance information has a relatively large value and has radial vectors as shown, as recognition direction information.

On the other hand, as shown in FIG. 4B, when there is a flat-shaped signboard, the recognizable distance may be relatively limited, and with respect to the recognition direction, recognition is easy in the front direction, but the recognition is difficult in the opposite direction. Therefore, in the case of FIG. 4B, the recognizable distance information has a relatively small value and has a one-directional vector as shown, as the recognition direction information.

Therefore, each of the information points 200 may have recognizable distance information and recognition direction information according to the characteristics thereof and, if necessary, may have one of the recognizable distance information and the recognition direction information.

Accordingly, in the candidate information point calculation operation (S110), the movement path guide device 110 calculates the one or more candidate information points 210 which can be recognized from the location of the user among the one or more information points 200 existing around the movement path.

Next, in the reference information point calculation operation (S120), the movement path guide device 110 calculates the one or more reference information points 220 to be used for guiding the user along the movement path among the one or more candidate information points 210, in consideration of the recognition direction information of each of the one or more candidate information points 210.

Figure 5A:
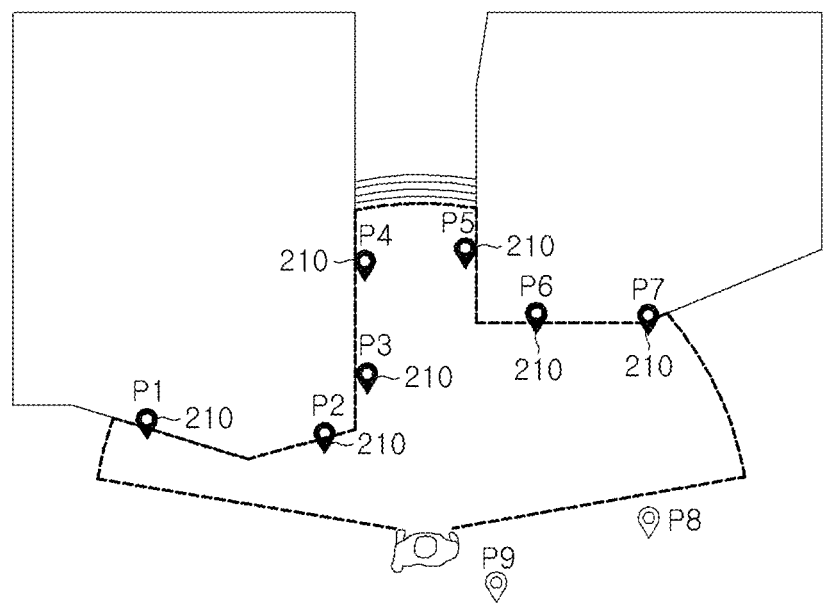
FIGS. 5A to 5C are diagrams illustrating a process of calculating a reference information point from one or more information points according to an embodiment of the present disclosure.

More specifically, as shown in FIG. 5A, in the candidate information point calculation operation (S110), one or more candidate information points (P1 to P7) which can be recognized from the location of a user are calculated from among one or more information points (P1 to P9) existing around a movement path.

Figure 5B:
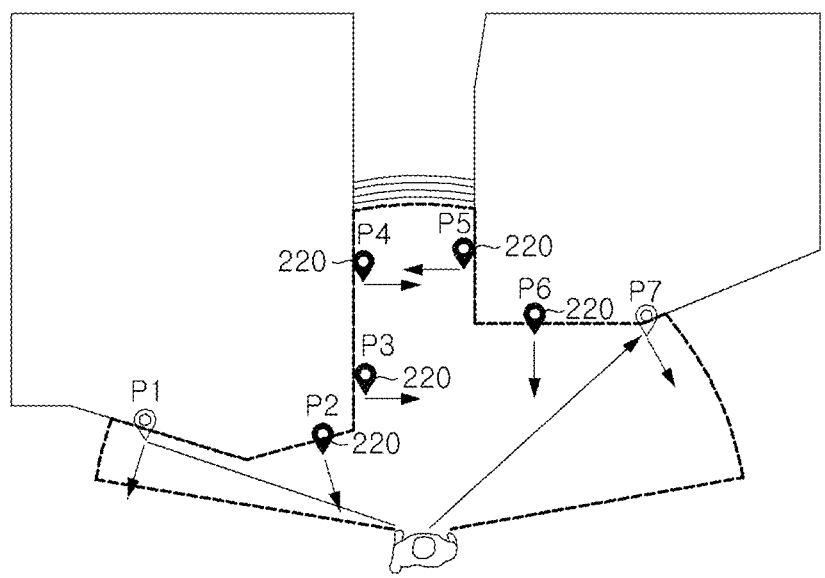

In addition, as shown in FIG. 5B, in the reference information point calculation operation (S120), one or more reference information points (P2 to P6) to be used for guiding the user along the movement path are calculated from among the one or more candidate information points (P1 to P7) in consideration of recognition direction information of each of the one or more candidate information points 210.

Further, in the movement path guide providing method, device, system and computer program according to an embodiment of the present disclosure, the reference information points may be calculated from among the candidate information points in consideration of the degree of proximity to the movement path.

Figure 5C:
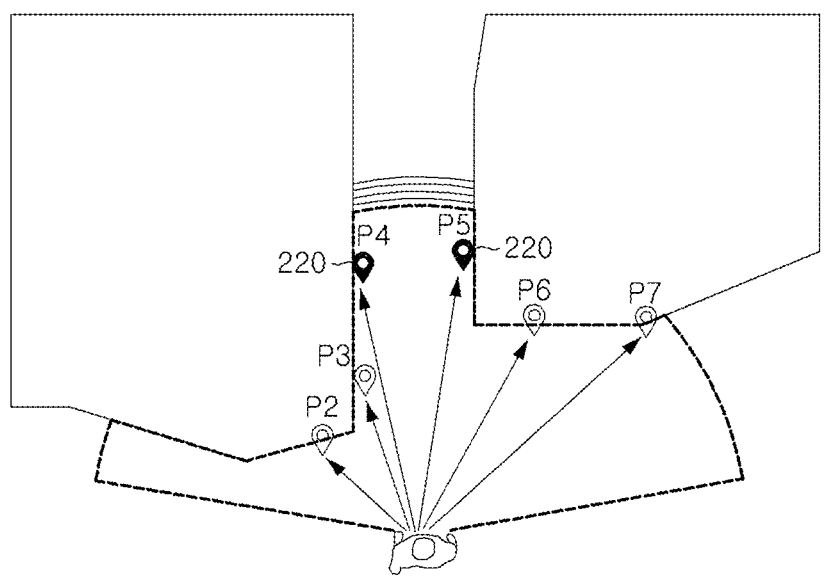

Accordingly, as shown in FIG. 5C, in the reference information point calculation operation (S120), one or more reference information points (P4 and P5) which are close to the movement path may be calculated from among the one or more candidate information points (P2 to P6) in consideration of the degree to which the one or more candidate information points 210 are close to the movement path.

Furthermore, in calculating the reference information points 220, the ease of recognition of the one or more candidate information points 210 may be considered. The ease of recognition refers to the degree to which a user can more easily perform recognition even under the same conditions such as the same distance and direction. More specifically, if there are multiple signboards, among signboards of a very famous company and an unknown company, the user can more easily recognize the signboard of the very famous company, and thus information on the ease of recognition is pre-allocated for each of the information points 210 and the reference information points 220 are calculated in consideration of the allocated information, so that the user can more easily recognize the reference information points 220 and thus more conveniently move along the movement path.

In addition, in FIGS. 5A to 5C, information points 200 located within a predetermined sight distance with reference to the location of the user are calculated as candidate information points 210, and then a reference information point 220 to be used for guiding a movement path is calculated from among the candidate information points 210. In this case, all information points 200 located within the predetermined sight distance with reference to the location of the user are collectively calculated as the candidate information points 210 without considering a recognition distance, which may be changed according to the characteristics of each of the information points 200. Therefore, a problem may occur in that an information point 200 which can be more easily recognized by the user is excluded from the candidate information points 210 or an information point 200 which is difficult to be actually recognized by the user is included in the candidate information points 210.

Accordingly, in the movement path guide providing method, device, system and computer program according to an embodiment of the present disclosure, as shown in FIG.

6, recognizable distance information (R) and recognition direction information ($\vec{A}$) may be allocated for each of information points 200, and a candidate information point 210 may be calculated based on recognizable distance information and recognition direction information of each of the information points 200.

Figure 6:
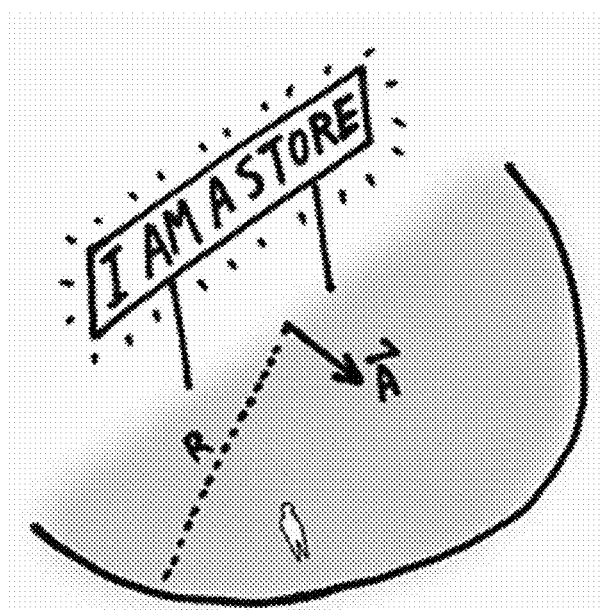
FIG. 6 is a diagram illustrating recognizable distance information and recognition direction information of an information point according to an embodiment of the present disclosure.

Furthermore, FIG. 6 illustrates that the recognizable distance information forms a shape of a semicircle (180 degrees), but the present disclosure is not necessarily limited thereto, and the recognizable distance information may be implemented in various shapes such as 90 degrees, 120 degrees, or 360 degrees according to the characteristics of each of the information points 200.

Figure 7:
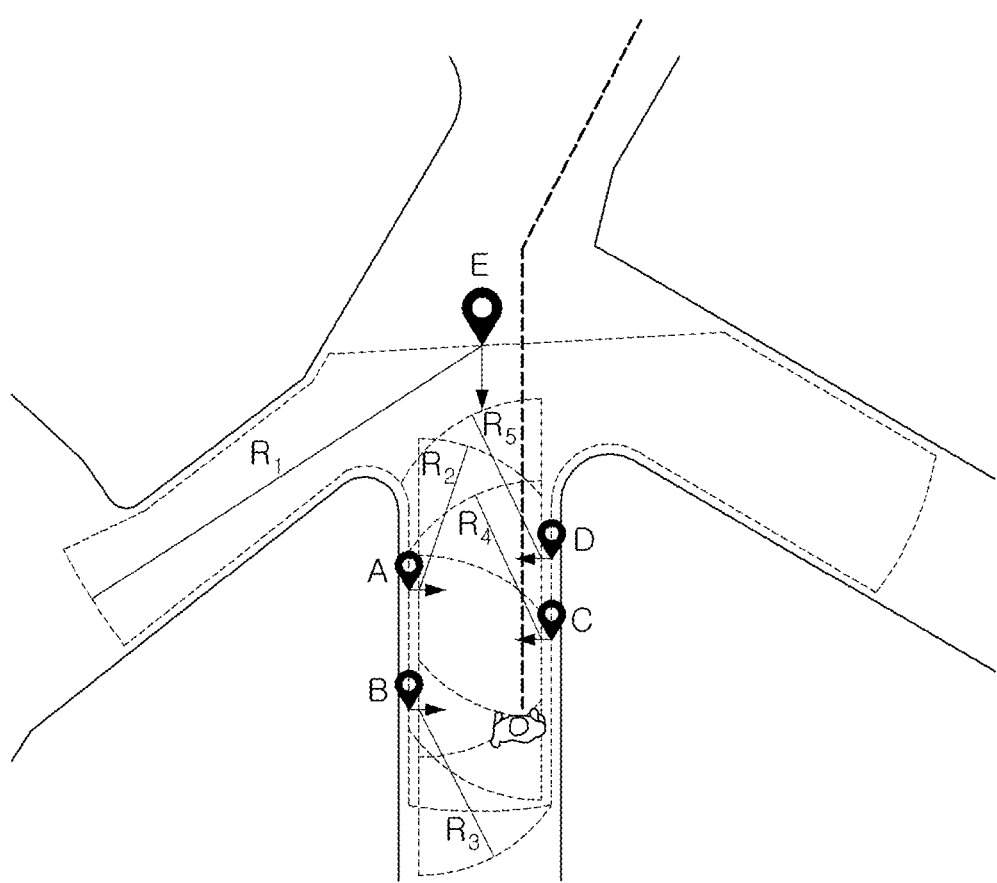
FIG. 7 is a diagram illustrating a process of calculating a reference information point from one or more information points according to an embodiment of the present disclosure.

For example, referring to FIG. 7, information point A has recognizable distance information of R2, information point B has recognizable distance information of R3, information point C has recognizable distance information of R4, information point D has recognizable distance information of R5, and information point E has recognizable distance information of R1.

Accordingly, a user is included in a recognizable distance of each of the information points A to E, and in the candidate information point calculation operation (S110), the information points A to E are calculated as candidate information points 210. In particular, as shown in FIG. 7, it can be seen that the information point E may be included in the candidate information points 210 since the information point E has the largest recognizable distance even through it is the farthest from the user.

Furthermore, in the movement path guide providing method, device, system and computer program according to an embodiment of the present disclosure, the reference information points 220 are calculated to be distinguished between a reference information point 220 located on the front side of a movement path where the user moves and a reference information point 220 located on the lateral side of the movement path, in consideration of the recognition direction information of the information points 200, so that it is possible to more specifically and conveniently provide the movement path to the user.

That is, when a front reference information point 221 located on a front side and a lateral reference information point 222 located on a lateral side are calculated to be distinguished, it is possible to provide a more detailed and convenient movement path guide to a user, for example, "Move in the direction of the clock tower (the front reference information point) if you can see store A (the lateral reference information point) on your right".

To this end, in the movement path guide providing method, device, system and computer program according to an embodiment of the present disclosure, the front reference information point 221 and the lateral reference information point 222 may be calculated to be distinguished using recognition direction information of each of the candidate information points 210.

Figure 8A:
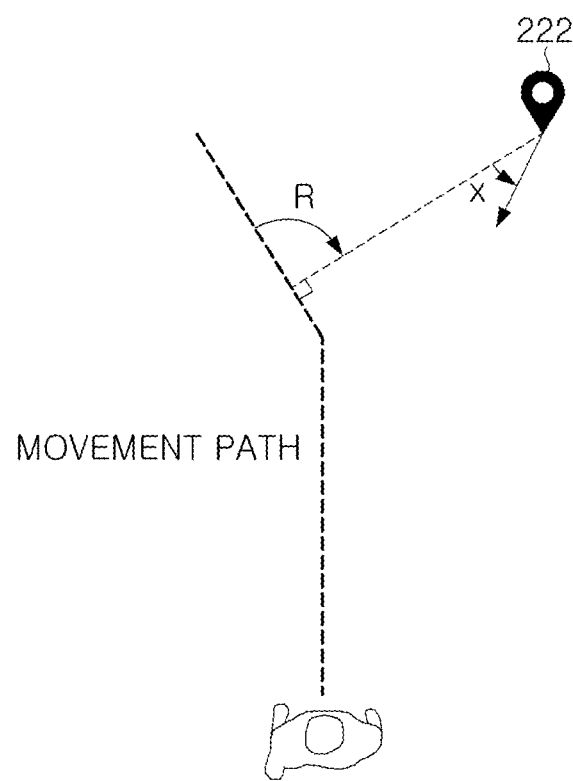
FIGS. 8A and 8B are diagrams illustrating a process of calculating reference information points located on front and lateral sides by using recognition direction information of an information point according to an embodiment of the present disclosure.
Figure 8B:
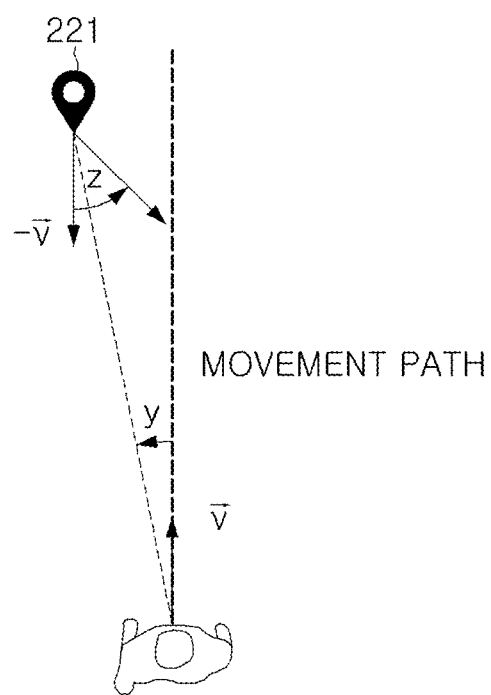

More specifically, referring to FIGS. 8A and 8B, as shown in FIG. 8A, in the reference information point calculation operation (S120), one or more lateral reference information points 222 may be calculated based on a first angle (x) formed by a first direction perpendicular to a movement path and a second direction of the recognition direction information at a point of the movement path located at the shortest distance from the one or more candidate information points 210.

In this case, if the first angle is less than or equal to a predetermined reference value (for example, 15 degrees), the reference information point may be calculated as a lateral reference information point 222. Further, a process of determining whether the lateral reference information point 222 is located on the right or left lateral side with reference to the movement path may be further performed.

In addition, as shown in FIG. 8B, in the reference information point calculation operation (S120), one or more front reference information points 221 may be calculated in consideration of a second angle (y in FIG. 8B) formed by a third direction linearly connecting the candidate information point at a location of the user and a fourth direction of a movement path at the location of the user, and a third angle (z in FIG. 8B) formed by a direction opposite to the fourth direction and a second direction of the recognition direction information.

In this case, if the second angle is less than or equal to a predetermined reference value (for example, 10 degrees) and the third angle is also less than or equal to the predetermined reference value (for example, 10 degrees), the reference information point may be calculated as a front reference information point 221.

Through the above process, it is determined whether the candidate information point 210 faces toward the user and whether the candidate information point 210 is at such a location in the user's field of view that the same is recognized as being located in front.

As a more specific example, a process of calculating the front reference information point 221 and the lateral reference information point 222 will be described with reference to FIG. 7.

A result of calculation of the first angle x, the second angle y, and the third angle z for the candidate information points 210 A to E of FIG. 7 may be shown in Table 1 below.

TABLE 1

| Candidate information point | Left/ Right | X (degrees) | Y (degrees) | Z (degrees) | Determination |
|---|---|---|---|---|---|
| A | Left | 0 | 42.5 | 90 | Left lateral reference information point |
| B | Left | 0 | 87.3 | 90 | |
| C | Right | 0 | −38.2 | −90 | |
| D | Right | 0 | −10.3 | −90 | Right lateral reference information point |
| E | Left | 86.4 | 6.2 | 3.6 | Front information point |

As shown in Table 1 above, it can be seen that since the first angle x is less than or equal to a predetermined reference value (for example, 15 degrees), the candidate information points A to D are located on the lateral side, and particularly, the candidate information points A and B are located on the left side and the candidate information points C and D are located on the right side.

Furthermore, among the candidate information points A and B, A having a direction close to the direction of the movement path of the user (that is, a value of the second angle y is small) may be calculated as a left lateral reference information point.

In addition, among the candidate information points C and D, D having a direction close to the direction of the movement path of the user (that is, a value of the second angle y is small) may be calculated as a right lateral reference information point.

Finally, since a candidate information point where the second angle y and the third angle z are less than or equal to a predetermined reference value (for example, 10 degrees) is E, the candidate information point E may be calculated as a front information point 221.

Furthermore, when a plurality of candidate information points 210 can be selected in calculating the front information point, the candidate information point 210 having the smallest second angle y may be selected.

Subsequently, in the movement path guide providing operation (S130), a guide for the movement path of the user is provided using the calculated reference information point 220.

Figure 9:
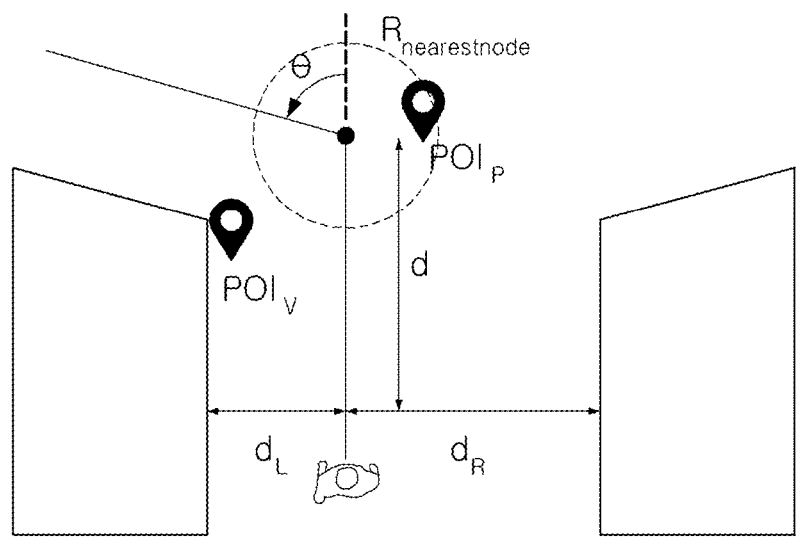
FIGS. 9 to 11 are diagrams illustrating a movement path guide phrase configuration in a movement path guide providing method according to an embodiment of the present disclosure.
Figure 10:
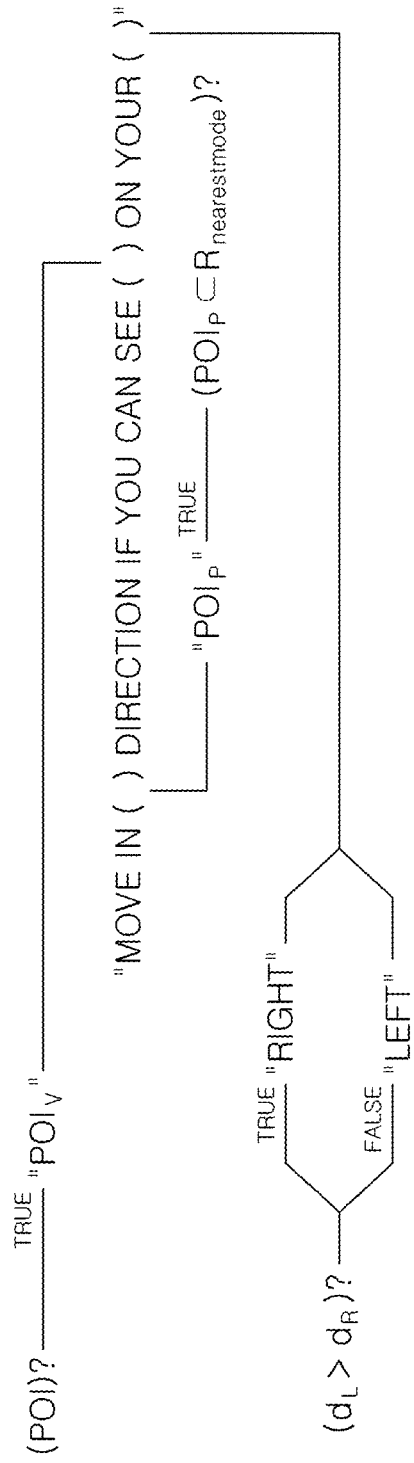
Figure 11:
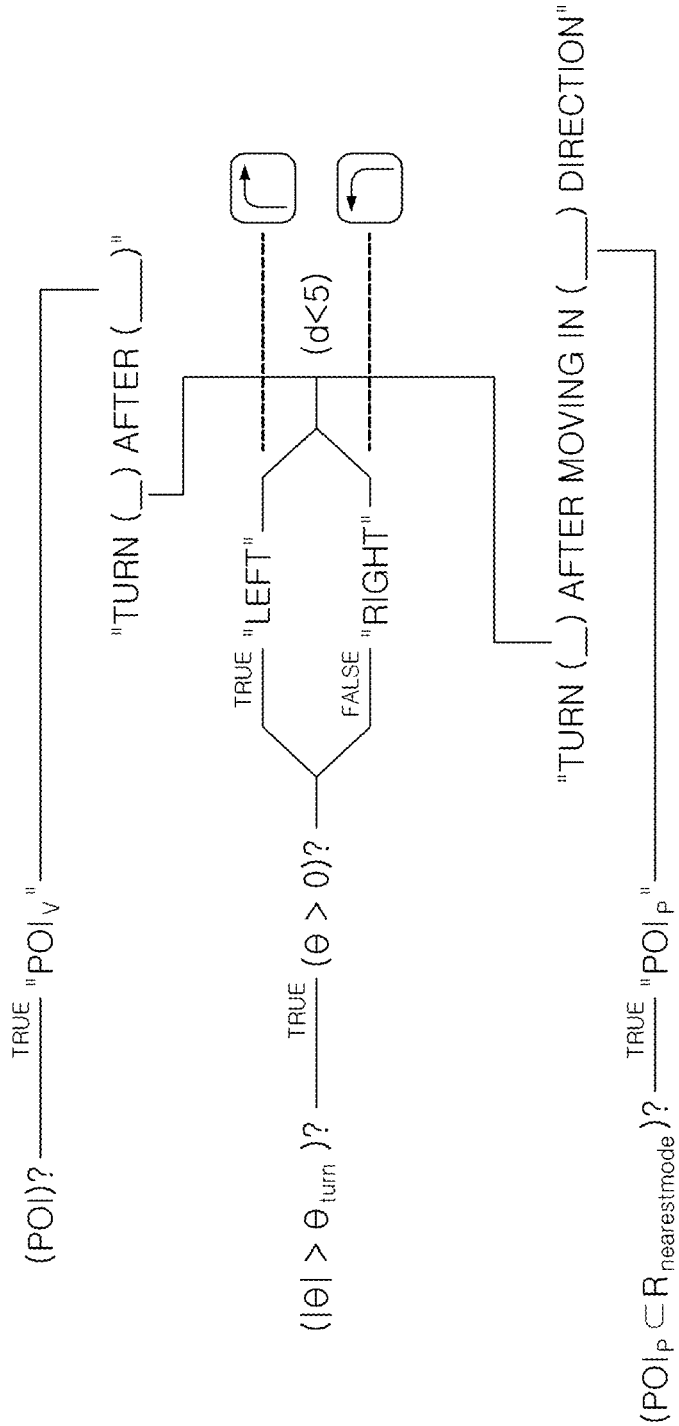

More specifically, FIGS. 9 to 11 illustrate movement path guide phrases and specific operations in a movement path guide providing method, device, system, and computer program according to an embodiment of the present disclosure.

First, FIG. 9 illustrates a case where a lateral reference information point (POIv) and a front reference information point (POIp) are calculated in a movement path of a user and a movement path guide is provided to the user by using the calculated reference information points.

In the movement path guide providing method, device, system, and computer program according to an embodiment of the present disclosure, a movement path guide phrase may be configured based on the lateral reference information point or the front reference information point, and furthermore, a movement path guide phrase may be configured using both the lateral reference information point and the front reference information point.

For example, a movement path guide phrase may be configured as "Move if you can see A on your right" or "Move towards B," and furthermore, a movement path guide phrase may be configured as "Move towards B if you can see A on your right."

Furthermore, as shown in FIG. 10, when the lateral reference information point POIv exists on both the left and right sides, a movement path guide phrase may be configured by comparing a distance $d_R$ from a user to a right wall with a distance $d_L$ from the user to a left wall to select a lateral reference information point POIv which can be more easily recognized by the user, and selecting the lateral reference information point POIv according to the comparison result.

Furthermore, when the front reference information point (POIp in FIG. 9) existing on the front side of the movement path is included in a proximity distance reference value ($R_{nearestnode}$ in FIG. 9), the front reference information point is used as a front reference information point and is included in the movement path guide phrase.

In addition, FIG. 11 illustrates a case of guiding a user to change a movement direction.

That is, in a case where a movement direction change value (θ in FIG. 9) of a user is larger than a predetermined reference value (that is, |θ|>θturn in FIG. 11), when a distance (d in FIG. 9) to a location where the user is to make a turn is less than or equal to a predetermined reference value (for example, 5 m), a guide is provided to the user.

In this case, as shown in FIG. 11, if the movement direction change value is greater than 0 (θ>0), it indicates a left turn, and if the movement direction change value is smaller than 0, it indicates a right turn, and thus a guide may be provided using the above.

In addition, if there is a lateral reference information point POIv near the location where the user is to make a turn, a guide phrase may be configured using the lateral reference information point POIv, for example, "Turn left (right) after A".

Furthermore, as shown in FIG. 11, when the front reference information point ($POI_p$ in FIG. 9) is located close to the location where the user is to make a turn (Rnearestnode in FIG. 9), a turn guide phrase may be configured based on the front reference information point.

Accordingly, in the movement path guide providing method, device, system, and computer program according to an embodiment of the present disclosure, a reference information point 220, which can be easily recognized, may be selected from among various information points 200 located around the path where the user moves, and the movement path may be provided to the user based on the selected reference information point, and further, reference information points 220 located on the front or lateral side of the movement path may be distinguished, so that the user can more conveniently and easily receive a movement path guide.

In addition, a computer program according to another aspect of the present disclosure is stored on a computer-readable recording medium in order to execute, on a computer, each operation of the movement path guide providing method described above. The computer program may include not only a computer program including a machine language code generated by a compiler, but also a computer program including a high-level language code which can be executed on a computer by using an interpreter or the like. In this case, the computer is not limited to a personal computer (PC), a notebook computer, or the like, and includes an integrated information processing device including a central processing unit (CPU) to execute a computer program, such as a server, a smart phone, a tablet PC, a PDA, and a mobile phone.

A computer-readable recording medium may continuously store a program executable by a computer, or temporarily store the program for execution or download. In addition, a recording medium may be a variety of recording means or storage means in a form in which a single piece of hardware or several pieces of hardware are combined. A recording medium is not limited to a medium directly connected to a computer system, but may be distributed over a network. Examples of a recording medium may include a magnetic medium such as a hard disk, a floppy disk, and a magnetic tape, an optical recording medium such as a CD-ROM and a DVD, a magneto-optical medium such as a floptical disk, and a ROM, a RAM, a flash memory, and the like, which are configured to store a program instruction. In addition, other examples of a medium may include a recording medium or a storage medium managed by an application store which distributes applications, or a server or a website which provides or distributes various other software.

Figure 12:
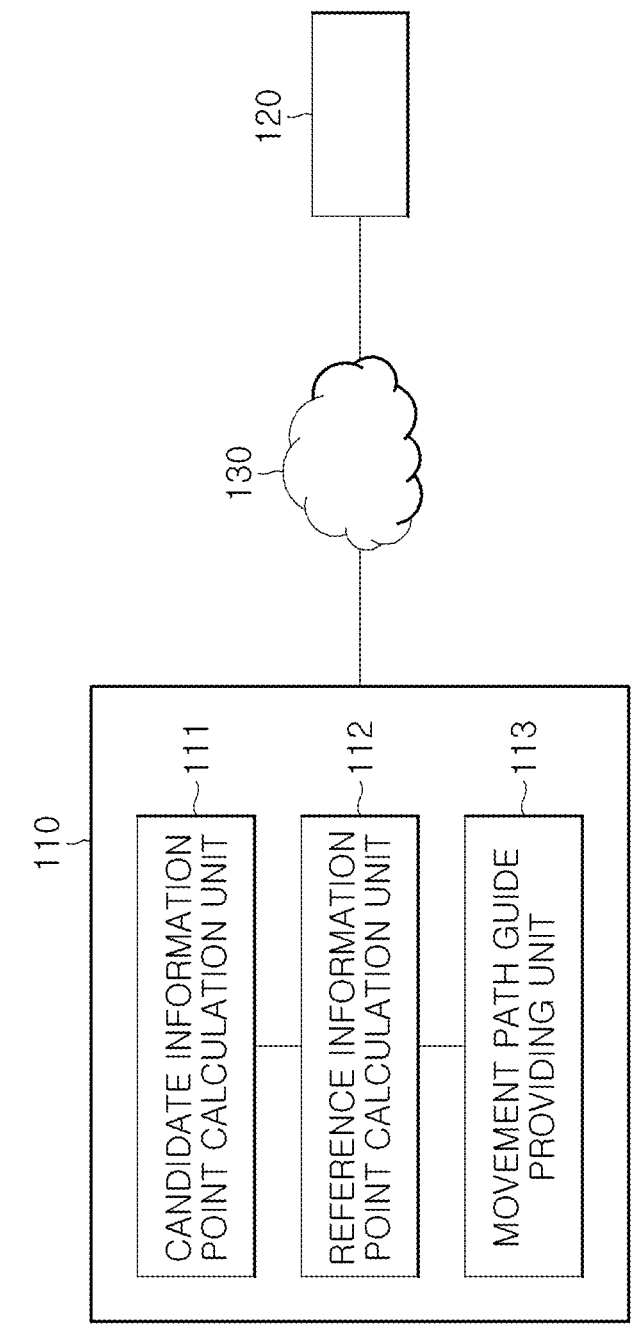
FIG. 12 is a block diagram illustrating a configuration of a movement path guide providing device according to an embodiment of the present disclosure.

In addition, FIG. 12 illustrates a configuration of a movement path guide device 110 according to an embodiment of the present disclosure. As shown in FIG. 12, the movement path guide device 110 according to an embodiment of the present disclosure may include a candidate information point calculation unit 111, a reference information point calculation unit 112, and a movement path guide providing unit 113. These units 111, 112 113 may be implemented collectively as a processor that executes the respective functions of these units according to instructions in a computer program, which may be stored in a memory accessible to the processor. The units 111, 112 113 of movement path guide device 110 may also be implemented as three separate and dedicated processors each performing its respective function.

In this case, the movement path guide device 110 may be a device which can receive a movement path guide while being carried by a user moving on foot, but the present disclosure is not necessarily limited thereto, and the movement path guide device may be applied to various cases, in which a user can relatively freely select or change a direction and a path, such as an electric moving means in addition to walking, and further, may be applied as various applications such as a device which provides a movement path guide at a fixed location in a shopping mall and the like.

Hereinafter, the movement path guide device 110 according to an embodiment of the present disclosure is described according to component parts. However, the present disclosure has been described in more detail in the movement path guide providing method according to an embodiment of the present disclosure, and thus the repetitive description will be omitted below.

In addition, in the movement path guide device 110 according to an embodiment of the present disclosure, the candidate information point calculation unit 111 calculates one or more candidate information points 210 which can be recognized from the location of a user among one or more information points 200 existing around a movement path.

Subsequently, the reference information point calculation unit 112 calculates one or more reference information points 220 to be used for guiding the user along the movement path among the one or more candidate information points 210, in consideration of recognition direction information of each of the one or more candidate information points 210.

Accordingly, the movement path guide providing unit 113 provides a guide for the movement path of the user, based on the reference information points 220.

In addition, FIG. 13 illustrates a configuration of a movement path guide providing system 100 according to an embodiment of the present disclosure. As shown in FIG. 13, the movement path guide providing system 100 according to an embodiment of the present disclosure may include a terminal 110 and a server 120.

The server 120 includes: a candidate information point calculation unit 121 which calculates one or more candidate information points 210 recognizable at a location of a user among one or more information points 200 existing around a movement path; and a reference information point calculation unit 122 which calculates one or more reference information points 220 to be used for guiding the user along the movement path among the one or more candidate information points 210, in consideration of recognition direction information of each of the one or more candidate information points 210. The candidate information point calculation unit 121 and the reference information point calculation unit 122 may be implemented collectively as a processor that executes the respective functions of these units according to instructions in a computer program, which may be stored in a memory accessible to the processor. The candidate information point calculation unit 121 and the reference information point calculation unit 122 may also be implemented as two separate and dedicated processors each performing its respective function.

In addition, the terminal 110 provides a guide for the movement path of the user, based on the reference information points 220 calculated by the server 120.

Accordingly, even when the terminal 110 does not have hardware for performing a complex operation, the terminal can provide a more convenient and easy movement path guide to a user by using an operation result of the server 110.

The above description is merely an illustrative example of the present invention, and a person of ordinary skilled in the art to which the present disclosure belongs can make various modifications and variations within the range that does not depart from the essential characteristics of the present disclosure. Accordingly, the disclosed embodiments of the present disclosure are not intended to limit the scope of the present disclosure but to illustrate the exemplary embodiments of the present disclosure, and are not limited to such embodiments. The range of protection of the present disclosure should be interpreted based on the following claims, and all technical features within the range equivalent to the claims should be construed as falling within the range of the rights of the present disclosure.

The invention claimed is:

1. A method for providing a user with a guide along a predetermined movement path from a departure point to a destination, the method comprising:
   a candidate information point calculation operation of calculating, by a movement path guide device moving with the user, one or more candidate information points each of which is recognized based on distance information from a location of the user among one or more information points existing around the movement path;
   a reference information point calculation operation of calculating, by the movement path guide device moving with the user, one or more reference information points to be used for guiding the user along the movement path from among the one or more candidate information points based on recognizable distance information and recognition direction information of each of the one or more candidate information points relative to the location of the user; and
   a movement path guide providing operation of providing the guide along the movement path of the user, based on the reference information points,
   wherein, in the reference information point calculation operation, the reference information points are calculated to be distinguished between a front reference information point and a lateral reference information point with respect to the location of the user on the movement path, and in the movement path guide providing operation, the guide is provided according to the front reference information point and the lateral reference information point, and
   wherein the lateral reference information point is calculated based on a first angle formed by a first direction perpendicular to the movement path and a second direction of the recognition direction information at a point of the movement path located at a shortest distance from a corresponding candidate information point, and the front reference information point is calculated in consideration of a second angle formed by a third direction linearly connecting a corresponding candidate information point at the location of the user and a fourth direction of the movement path at the location of the user, and a third angle formed by a direction opposite to the fourth direction and a second direction of the recognition direction information.

2. The method of claim 1, wherein
the one or more candidate information points are located within a predetermined recognizable distance with reference to the location of the user.

3. The method of claim 1, wherein, in the reference information point calculation operation, one or more reference information points to be used for guiding the user along the movement path are calculated from among the one or more candidate information points in consideration of predetermined information on ease of recognition of the one or more candidate information points.

4. The method of claim 1, wherein, in the reference information point calculation operation, a candidate information point closest to the movement path is calculated as the reference information point.

5. A non-transitory computer readable recording medium for storing a computer program for enabling a computer to execute the operations of claim 1.

6. A movement path guide device configured to be moved with a user for providing a user with a guide along a movement path from a departure point to a destination, the device comprising:

a candidate information point calculation unit configured to calculate one or more candidate information points each of which is recognized based on distance information from a location of the user among one or more information points existing around the movement path;

a reference information point calculation unit configured to calculate one or more reference information points to be used for guiding the user along the movement path from among the one or more candidate information points based on recognizable distance information and recognition direction information of each of the one or more candidate information points relative to the location of the user; and a movement path guide providing unit configured to provide the guide along the movement path of the user, based on the reference information points, wherein the reference information point calculation unit is configured to calculate the reference information points so that the reference information points are distinguished between a front reference information point and a lateral reference information point with respect to the location of the user on the movement path, and the movement path guide providing unit is configured to provide the guide according to the front reference information point and the lateral reference information point, and wherein the lateral reference information point is calculated based on a first angle formed by a first direction perpendicular to the movement path and a second direction of the recognition direction information at a point of the movement path located at a shortest distance from a corresponding candidate information point, and the front reference information point is calculated in consideration of a second angle formed by a third direction linearly connecting a corresponding candidate information point at the location of the user and a fourth direction of the movement path at the location of the user, and a third angle formed by a direction opposite to the fourth direction and a second direction of the recognition direction information.

7. A system for providing a user with a guide along a movement path from a departure point to a destination, the system comprising:

a server which comprises a candidate information point calculation unit configured to calculate two or more candidate information points which are recognized based on distance information from a location of the user among one or more information points existing around the movement path, and a reference information point calculation unit configured to calculate two or more reference information points to be used for guiding the user along the movement path from among the one or more candidate information points based on recognizable distance information and recognition direction information of each of the one or more candidate information points relative to the location of the user; and a terminal configured to provide the guide along the movement path of the user, based on the reference information points, wherein the reference information point calculation unit of the server is configured to calculate the reference information points so that the reference information points are distinguished between a front reference information point and a lateral reference information point with respect to the location of the user on the movement path, and the terminal is configured to provide the guide according to the front reference information point with reference to the lateral reference information point, and wherein the lateral reference information point is calculated based on a first angle formed by a first direction perpendicular to the movement path and a second direction of the recognition direction information at a point of the movement path located at a shortest distance from a corresponding candidate information point, and the front reference information point is calculated in consideration of a second angle formed by a third direction linearly connecting a corresponding candidate information point at the location of the user and a fourth direction of the movement path at the location of the user, and a third angle formed by a direction opposite to the fourth direction and a second direction of the recognition direction information.

* * * * *